(12) United States Patent
Spieler et al.

(10) Patent No.: US 7,702,557 B2
(45) Date of Patent: Apr. 20, 2010

(54) SYSTEM AND METHOD FOR MANAGER ENHANCED RETURN ON COLLATERALIZED DEBT OBLIGATION TRANSACTIONS

(75) Inventors: Christian Spieler, Frankfurt (DE); Jonathan Slater, London (GB); Brigitta Walisch, London (GB); Jonathan Adams, London (GB)

(73) Assignee: JP Morgan Chase Bank, New York, NY (US)

( * ) Notice: Subject to any disclaimer, the term of this patent is extended or adjusted under 35 U.S.C. 154(b) by 1141 days.

(21) Appl. No.: 10/644,281

(22) Filed: Aug. 20, 2003

(65) Prior Publication Data

US 2004/0143528 A1 Jul. 22, 2004

Related U.S. Application Data

(60) Provisional application No. 60/406,909, filed on Aug. 28, 2002.

(51) Int. Cl.
*G06Q 40/00* (2006.01)
(52) U.S. Cl. .................... 705/36 R; 705/35; 705/37
(58) Field of Classification Search ............. 705/35, 705/36 R, 37
See application file for complete search history.

(56) References Cited

U.S. PATENT DOCUMENTS

| | | | |
|---|---|---|---|
| 5,704,045 A | 12/1997 | King et al. | |
| 5,946,666 A * | 8/1999 | Nevo et al. | 705/36 R |
| 6,092,056 A | 7/2000 | Tull, Jr. et al. | |
| 6,148,293 A | 11/2000 | King | |
| 6,282,520 B1 | 8/2001 | Schirripa | |
| 6,338,047 B1 | 1/2002 | Wallman | |
| 6,360,210 B1 | 3/2002 | Wallman | |
| 6,687,681 B1 * | 2/2004 | Schulz et al. | 705/36 T |
| 7,174,313 B1 * | 2/2007 | Martinez | 705/36 R |
| 7,181,422 B1 * | 2/2007 | Philip et al. | 705/36 R |
| 7,231,364 B1 * | 6/2007 | Cobrinik et al. | 705/37 |
| 2001/0011243 A1 | 8/2001 | Dembo et al. | |
| 2001/0018677 A1 | 8/2001 | Hoffman | |
| 2002/0019793 A1 * | 2/2002 | Frattalone | 705/36 |
| 2002/0032586 A1 * | 3/2002 | Joao | 705/4 |
| 2002/0055897 A1 * | 5/2002 | Shidler et al. | 705/35 |
| 2002/0059127 A1 * | 5/2002 | Brown et al. | 705/36 |

(Continued)

FOREIGN PATENT DOCUMENTS

JP 2002-140514 A 5/2002

(Continued)

OTHER PUBLICATIONS

BaFin—Federal Financial Supervisory Authority, Circular R Jan. 2002, Apr. 12, 2002.*

(Continued)

*Primary Examiner*—Hani Kazimi
*Assistant Examiner*—William E Rankins
(74) *Attorney, Agent, or Firm*—Lowenstein Sandler PC (57) ABSTRACT

A portfolio of debt instruments, managed by an asset manager according to the terms of an asset management agreement between the asset manager and a sponsor, is a debt index. Multiple deals, as collateralized obligations, are linked to the debt index. Changes to the index by the asset manager are reflected in the linked deals. A break in the linkage to the index can be triggered by different events.

19 Claims, 6 Drawing Sheets

U.S. PATENT DOCUMENTS

| | | | | |
|---|---|---|---|---|
| 2002/0069161 A1* | 6/2002 | Eckert et al. | ............ | 705/38 |
| 2002/0069635 A1* | 6/2002 | Tsukamoto | ............ | 57/200 |
| 2002/0095369 A1* | 7/2002 | Kaplan et al. | ............ | 705/37 |
| 2002/0107771 A1 | 8/2002 | McGuire | | |
| 2002/0116325 A1 | 8/2002 | Wise et al. | | |
| 2002/0156709 A1* | 10/2002 | Andrus et al. | ............ | 705/35 |
| 2003/0088492 A1* | 5/2003 | Damschroder | ............ | 705/36 |
| 2004/0024671 A1* | 2/2004 | Freund | ............ | 705/35 |
| 2004/0024695 A1* | 2/2004 | Melamed | ............ | 705/38 |
| 2005/0119962 A1* | 6/2005 | Bowen et al. | ............ | 705/37 |
| 2005/0144108 A1* | 6/2005 | Loeper | ............ | 705/36 |
| 2006/0069635 A1* | 3/2006 | Ram et al. | ............ | 705/37 |
| 2008/0313097 A1* | 12/2008 | Chacko et al. | ............ | 705/36 R |

FOREIGN PATENT DOCUMENTS

| | | | |
|---|---|---|---|
| JP | 2002140514 A | | 5/2002 |
| JP | 2005078389 A | * | 3/2005 |
| WO | WO 9954838 A1 | * | 10/1999 |
| WO | WO 00/75819 A2 | | 12/2000 |
| WO | WO 0133316 A2 | * | 5/2001 |
| WO | WO 0186557 A1 | * | 11/2001 |

OTHER PUBLICATIONS

CDO Evaluator and Portfolio Benchmarks, Sten Bergman, Securitization Conduit. Philadelphia: 2002. vol. 5, Iss. 1-4; p. 38.*

All That Jazz New CDO built for managers who like improvising, Mairin Burns. The Investment Dealers' Digest: IDD. New York: Nov. 19, 2001; p. 1.*

Banker fight for CDO supremacy, Michael Peterson. Euromoney. London: Deb. 2002., Iss. 394; p. 72.*

CDO Transactions Structural Basics, Nik Khakee, Elwyn Wong. Securitization Conduit. Philadelphia: 2002. vol. 5, lss; 1-4: p. 18.*

BaFin—Federal Financial Supervisory Authority on Apr. 12, 2002, the German Federal Insurance Supervisory Office (Bundesaufsichtsamt for das Versicherungswesen—BAV [since May 1, 2002: Bundesanstalt for Finanzdienstleistungsaufsicht—BAFin]) issued the following circular: Circular R Jan. 2002 Insurance Supervision.*

S&P: Interstar Launches Largest Domestic Austn RMBSDrawing PR Newswire Wednesday, Sep. 19, 2001.*

BaFin (Federal Financial Supervisory Authority, Circular R Jan. 2002).*

Carter, Jeremy & Wadew, Taron,.CDO Structures Get Creative to Entice Buyers, Aug. 18, 2002.

CDO Handbook, JPMorgan Securities, Inc., May 29 2001.

Cagan, Penny, Capital market solutions for op risks: Does a credit derivative model make sense?; Operational Risk, Jun. 2001.

Skora, Richard K.; The Credit Default Swap; www.skora.com, 1998.

Kothari, Vinod, Credit Derivatives, http://www.credit-deriv.com/creprime.html.

Calls are puts and puts are calls, http://www.finpipe.com/puts.htm.

Business School Credit Derivatives—Part II, Oct. 24, 2002, http://www.indiainfoline.com/bisc/crede.html.

Credit Default Swaps 101; DerivatiesStrategy.com, http://www.derivativesstrategy.com/magazine/archive/2000/0800col.asp.

CDO Evaluator Applies Correlation and Monte Carlo Simulation to the Art of Determining Portfolio Quality, Standard & Poor's, Nov. 12, 2001, http://www.standardandpoors.com/emarketing/structuredfinance/copyof111201_evaluator.html.

Skora, Richard K., Correlation—the hidden risk in Collateralized Debt Obligations, Nov. 21, 1998, www.skora.com.

Mayer, Brown, Rowe & Maw; Collateralized Debt Obligation Practice; Mar. 2001, www.mayerbrownrowe.com/cdo.

Van Wijk, Ed; The CDO Market: An Introduction, Feb. 21, 2001.

Morgan, Deutsche both claim German Innovation in Credit; Risk.net.

Kothari, Vinod; Evolution of Credit Derivatives, http://www.credit-deriv.com/evolution.htm.

Kothari, Vinod; Securitization of Banking Assets, CBOs, CLOs and CDOs, Aug. 9, 2001, http://www.vinodkothari.com/bankloan.htm.

Kothari, Vinod; Links and materials on synthetic CDOs, http://www.credit-deriv.com/syntheticCDO.htm.

Waifo, Elizabeth and Greenberg, Mark I., Key issues in structuring a synthetic securitisation transaction; Sidley Austin Brown & Wood 2001.

An Introduction to the Hedging Greeks, http://www.finpipe.com/introhedge.htm.

* cited by examiner

SYSTEM AND METHOD FOR MANAGER ENHANCED RETURN ON COLLATERALIZED DEBT OBLIGATION TRANSACTIONS

This application claims priority to U.S. Provisional Patent Application Ser. No. 60/406,909, filed Aug. 28, 2002, entitled: SYSTEM AND METHOD FOR MANAGER ENHANCED RETURN ON COLLATERALIZED DEBT OFFERING TRANSACTIONS, the disclosure of which is incorporated herein by reference.

BACKGROUND

1. Field of the Invention

The invention relates to the field of debt obligations and more particularly to collateralized debt obligations.

2. Description of the Related Art

Various forms of Collateralized Debt Obligation (CDO) structures are known. For example, Asset-Managed CDOs can provide a tool for clients to invest in a tranche of a managed portfolio, but they lack the flexibility that some clients desire. Traditional CDO transactions have a pre-defined ramp-up period and closing date which must be observed. This can cause a lack of flexibility with respect to execution timing. Traditional CDO transactions offer certain tranches in the form of swaps and other tranches in the form of notes. This can cause a lack of flexibility with respect to the format. The counterparty for clients of a traditional CDO is normally an SPV. This can cause a lack of flexibility with respect to the counterparty. Traditional CDO transactions are predefined and, once structured, provide little flexibility with respect to individual investors' transaction size wishes. This can cause a lack of flexibility with respect to transaction size. The transactions resulting out of a traditional CDO are normally pre-defined and there is little possibility to accommodate client's needs and risk/return preferences. This can cause a lack of flexibility with respect to structuring.

One existing structure is CDO tranching based on a syndication approach. In this approach, the CDO is typically managed by an asset manager on behalf of an investor. However, the structure is somewhat inflexible in terms of format, size, exact risk/return profile, structure and execution timeline.

Another existing structure is Customized Equity, CLIP and Mezzanine tranche. In this approach, each deal is tailor-made. However, the deal is based on a portfolio that is not managed by an outside asset manager. Instead, the portfolio is either static or lightly managed by the investor himself.

Because the known CDO structures lack either certain flexibility for client/investor needs, or do not provide portfolio management, what is needed is a system and method that provides greater flexibility and also provides for enhanced portfolio management.

The preceding description is not to be construed as an admission that any of the description is prior art relative to the present invention.

SUMMARY OF THE INVENTION

In one aspect, the invention provides a system and method for managing collateralized obligations. This comprises identifying a plurality of debt obligations, which together constitute an index; linking a first deal to the index; linking a second deal to the index; changing at least one debt obligation in the index; and responsive to the change of the debt obligation in the index, changing an obligation of the linked first deal.

In an additional aspect, the invention provides changing an obligation of the linked second deal in response to the change of the debt obligations in the index.

In an additional aspect, the invention provides establishing a tranche structure for the linked first deal.

In an additional aspect, the invention provides a tranche structure with a single tranche.

In an additional aspect, the invention provides establishing a tranche structure for the linked second deal, wherein the tranche structure of the first linked deal is different from the tranche structure of the second deal.

In an additional aspect, the invention provides forming the first and second deals at distinct and different times.

In an additional aspect, the invention provides waiting a predetermined time after identifying the plurality of debt obligations before allowing any change of the debt obligations in the index.

In an additional aspect, the invention provides establishing for different times, a maximum allowable rate of change to the index.

In an additional aspect, the invention provides breaking the link to the first deal in response to a change of a debt obligation.

In an additional aspect, the invention provides establishing an asset management agreement between a sponsor and an asset manager and managing the index according to terms of the agreement.

In an additional aspect, the invention provides the linked deals are managed notes, managed schuldscheins, special purpose vehicles, or swaps.

In an additional aspect, the invention provides the obligations of the linked deals are debt obligations or synthetic obligations.

In one aspect, the invention provides a system and method for managing collateralized obligations. This comprises establishing an asset management agreement between a sponsor and an asset manager; identifying a plurality of debt obligations, which together constitute an index; managing the index according to the terms of the agreement; and linking a plurality of deals to the index.

The foregoing specific aspects of the invention are illustrative of those which can be achieved by the present invention and are not intended to be exhaustive or limiting of the possible advantages that can be realized. Thus, the aspects of this invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

A. System

Figure 1:
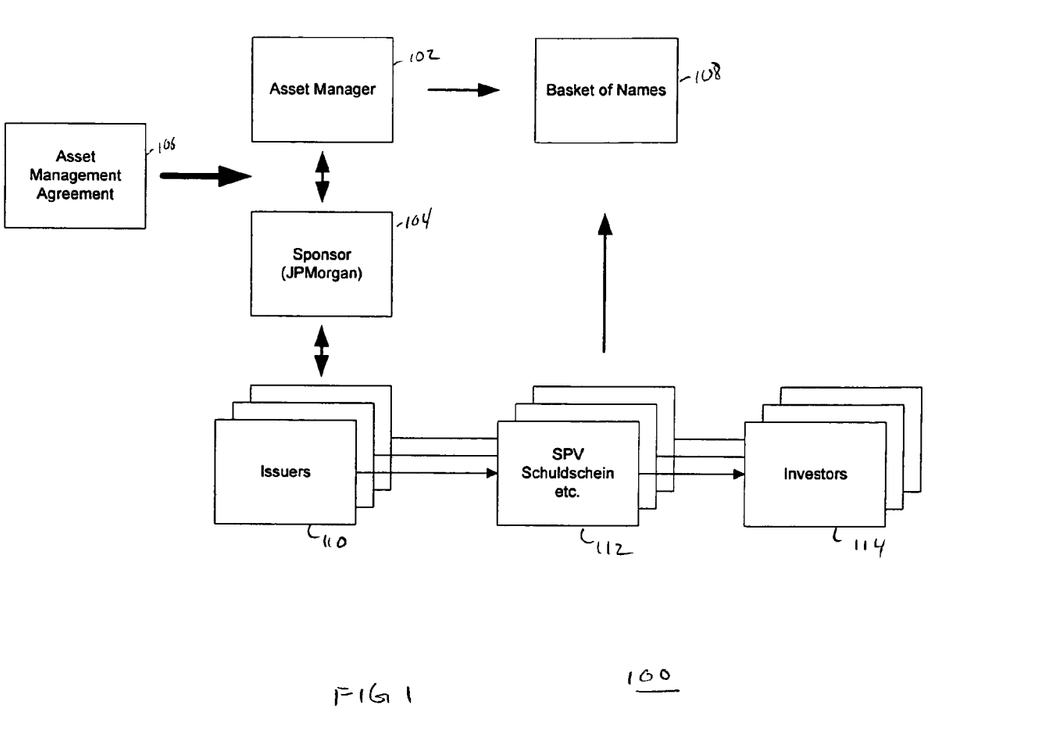
FIG. 1 illustrates an embodiment of a system and relationships between entities according to the invention.

FIG. 1 illustrates the various parties or entities that are involved in one embodiment of the invention and the relationships between the parties or entities. As a group, these parties, their interrelationships, and the interconnections between them constitute system 100 according to the invention.

As part of the framework for the invention, asset manager 102 and sponsor 104 enter into an asset management agreement 106. Under the terms of this agreement, asset manager 102 agrees to manage a reference portfolio of debt, or "basket of names" in return for a management fee. This reference portfolio is a form of index, and is also referred to as a debt index in this application. The asset management agreement is a contract between sponsor 104 and asset manager 102. The agreement has an effective term or duration, which is usually a number of years. The agreement also describes a number of governing conditions. Under the terms of those governing conditions, the actions of the asset manager are limited with regard to the substitutions or changes to the composition of the debt index. One of those conditions may limit the number of substitutions that the asset manager can make to the index during different periods of the agreement. Other possible conditions of the agreement are described below.

Once the asset management agreement 106 between sponsor 104 and asset manger 102 is in place, it is possible to link a number of different deals 112 to the debt index 108 under the terms of the agreement 106.

To create deal 112, a specific issuer 110 typically creates the necessary legal structure for a deal 112, and once the deal 112 is created, one or more investors 114 can then invest in the deal.

In a manner that is generally known for collateralized debt obligations, each of the deals 112 may include multiple tranches, with associated risk and return for each tranche. In one embodiment of the invention, it is also possible for each deal 112 to have a single tranche.

Although not illustrated in FIG. 1, multiple computers are used by the different parts of system 100. These computers include central processor units, volatile and non-volatile memory, both fixed and removable code storage devices, input and output devices, network interfaces, keyboards and displays.

Figure 2:
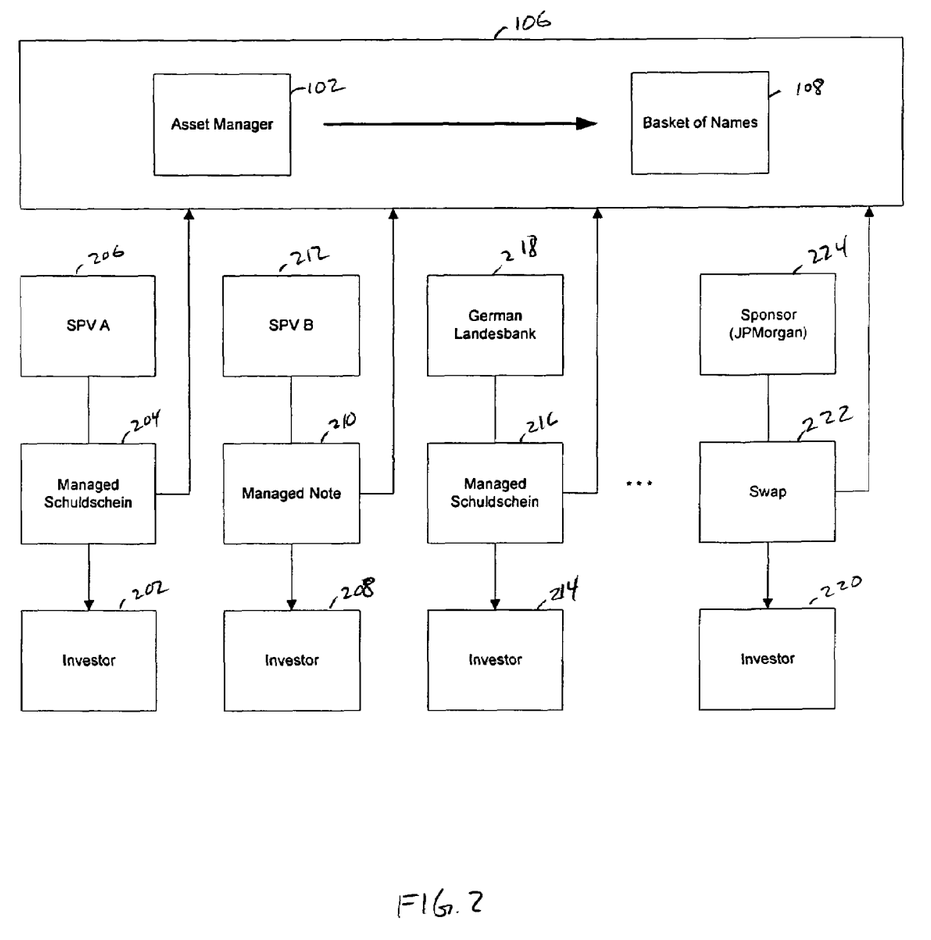
FIG. 2 illustrates an embodiment of a system and relationships between entities according to the invention.

FIG. 2 illustrates examples of the different types of linkage available with different embodiments of the invention. Investor 202 invests in a managed schuldschein 204 that is available from special purpose vehicle A (206). Managed schuldschein 204 has a zero coupon mezzanine with a tranche of 5% to 7%, and a 14 year maturity. The debt portfolio that serves as the reference portfolio for managed schuldschein 204 is the same portfolio (debt index 108) that is described in asset management agreement 106 and managed by asset manager 102.

Investor 208 invests in a managed note 210 that is available from special purpose vehicle B (212). Managed note 210 is a credit-linked investment-protected (CLIP) product that has a minimum coupon with a tranche of 0% to 6%, and a 10 year maturity. The debt portfolio that serves as the reference portfolio for managed note 210 is the same portfolio (debt index 108) that is described in asset management agreement 106 and managed by asset manager 102.

Investor 214 invests in a managed schuldschein 216 that is available from German Landesbank 218. Managed schuldschein 216 is a mezzanine with an equity kicker with a tranche of 0% to 6%, and a 10 year maturity. The debt portfolio that serves as the reference portfolio for managed schuldschein 216 is the same portfolio (debt index 108) that is described in asset management agreement 106 and managed by asset manager 102.

Investor 220 invests in a SWAP 222 that is available from the sponsor (224). SWAP 222 is a mezzanine with an equity kicker with a tranche of 2% to 5%, and a 4 year maturity. The debt portfolio that serves as the reference portfolio for SWAP 222 is the same portfolio (debt index 108) that is described in asset management agreement 106 and managed by asset manager 102.

A Method

Figure 3:
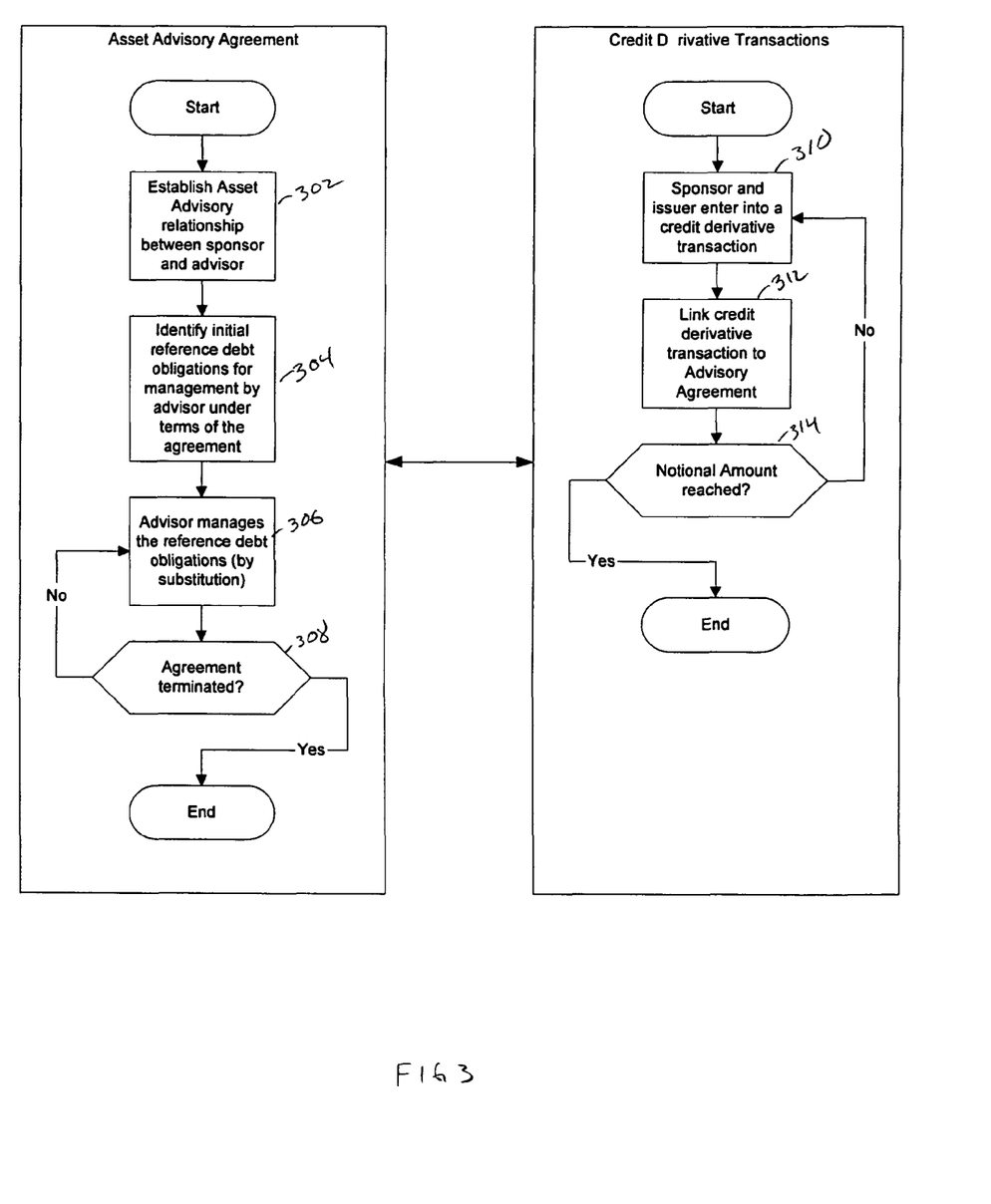
FIG. 3 illustrates steps in an embodiment of a method according to the invention.

FIG. 3 illustrates steps in an embodiment of the invention. At step 302, asset manager 102 and sponsor 104 agree on the terms of an advisory relationship, as reflected in an asset management agreement 106. As part of that process, at step 304, asset manager 102 and sponsor 104 identify an initial portfolio of names. That portfolio of names is the debt index and it is managed by asset manager 102 according to the terms of the asset management agreement 106. Issuers 110 can link deals 112 to the debt index.

At steps 306, 308, asset manager 102 manages the composition of the debt index. This management includes the substitution of names in the index, by removing one name from the debt index and adding a different name to the debt index.

Shortly after asset manager 102 and sponsor 104 agree on the terms of the asset management agreement and identify the names in the initial debt index, issuers may begin to create deals that link to the debt index.

Management of the debt index 108 by asset manager 102 continues until the agreement terminates at step 308.

At step 310, an issuer 110 and sponsor 104 enter into a credit derivative transaction.

At step 312, the credit derivative transaction is linked to the debt index and asset management agreement.

At step 314, the total value of deals linked to the debt index is checked to see whether the notional amount is reached. If yes, then no more deals are linked. If no, then at step 310 another issuer 110 and sponsor 104 may enter into a credit derivative transaction. In one embodiment, the credit derivative transactions may be formed at distinct and different times.

Although in this embodiment there is a notional limit on the number or size of deals that can be linked to the debt index, it is also possible that there is no limit on the number or size of deals and instead of step 314, the process loops from step 312 to step 310.

Debt Index

There are similarities between the debt index of the instant invention and other indexes, such as the S&P 500 index, or the NASDAQ 100 index. In each of these indexes, there are criteria for including an entity in the index and there are also criteria for removing an entity from the index. Also, in each of these indexes, the index manager does not usually hold the entities that are listed in or make up the index.

Figure 4:
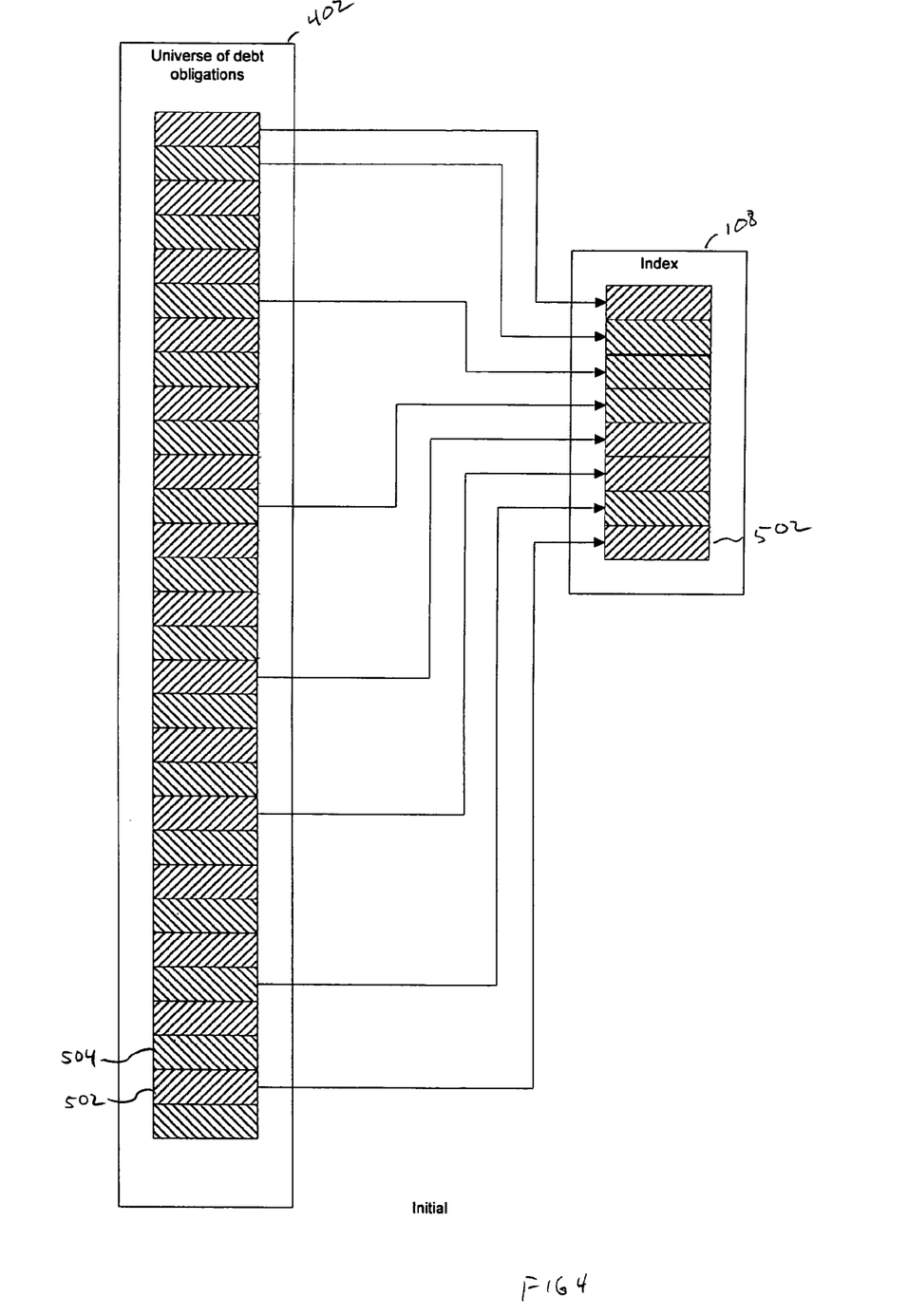
FIGS. 4 and 5 illustrate a reference portfolio or index and changes in the index according to one embodiment of the invention.

The make up or membership of debt index 108 is initially determined at step 304 of FIG. 3. The names that make up debt index 108 are selected from a universe of possible debt obligations 402. Aspects of the selection process or criteria are described generally in asset management agreement 106.

For example, the index might include only U.S. company debt obligations. Additionally, there may be industry or sector allocations with limitations on the percentage or size of the debt obligations in each industry or sector.

By selecting the initial names in the debt index, asset manager 102 and sponsor 104 generally try to identify names that will provide good return with low risk. Over time, the names represented by the debt index may no longer represent the best mix of names for a particular risk and return. When asset manager 102 believes that a change is needed in the index, it is usually because they believe that there are other candidates for the index that will provide a better return for the same risk, the same return for less risk or a better return for less risk.

Figure 5:
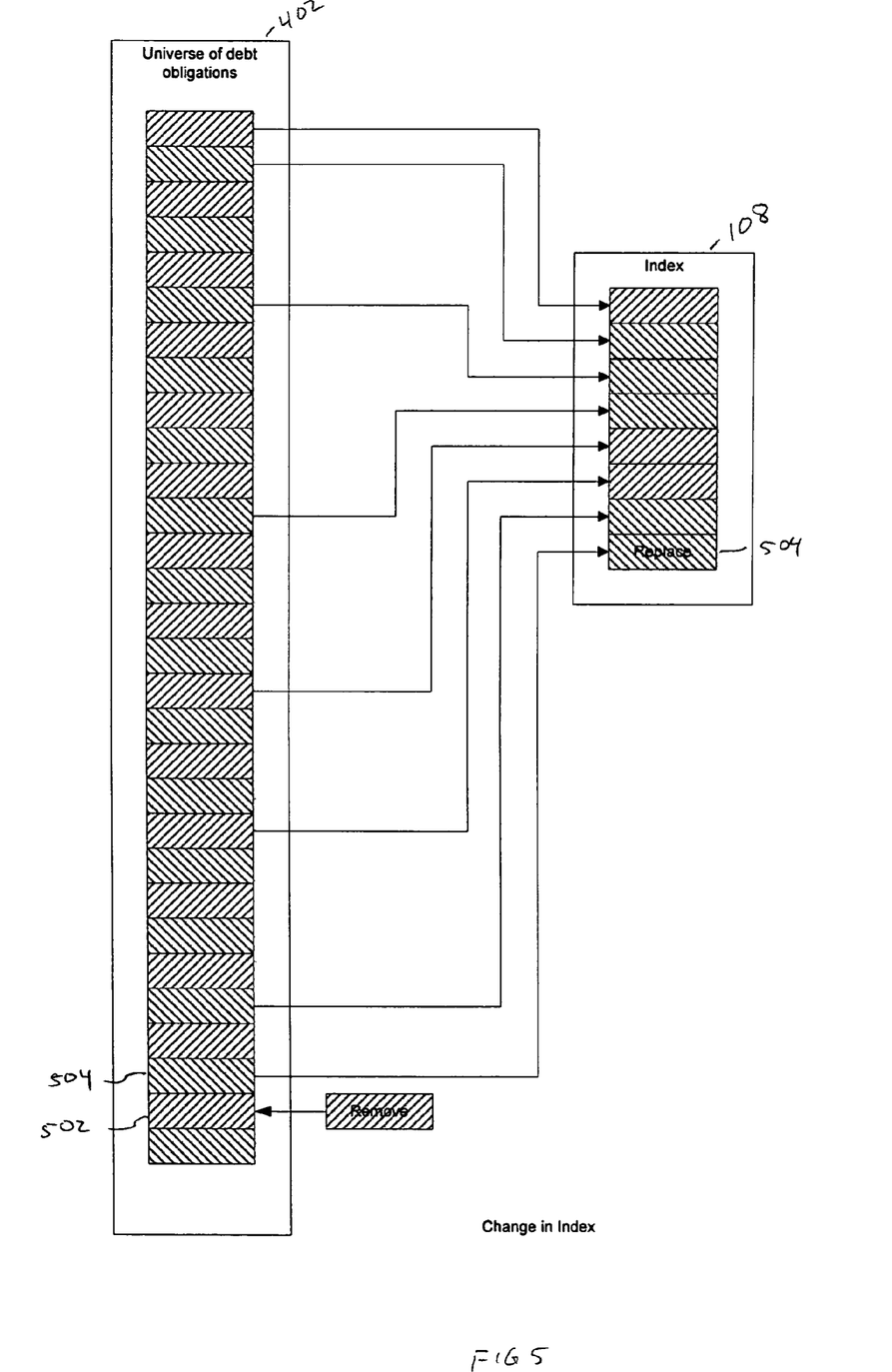

Management of the debt index 108 by asset manager 102 is primarily by substitution of names in the index. FIGS. 4 and 5 illustrate this substitution. As illustrated, name 502 was part of the initial debt index and after substitution, name 502 is no longer part of the debt index, but name 504 is part of the debt index.

The criteria for selection and substitution might include some or all of the following, or similar criteria: maximum percentage of the names in the debt index that can be substituted is 24%; substitute name must have at least an effective rating of Baa3; modified debt index must have a weighted average long term rating score of at least 378 (Baa1); modified debt index must have a weighted average recovery rate of at least 35%; number of names in a certain country cannot be higher than the country limit; the number of names in a certain industry sector cannot be higher than the industry sector limit of 12%; substitute name is and was not the subject of a Credit Event or Failure to Pay; diversity score of the modified debt index as defined by one of the credit rating companies must be maintained or improved; new bid must be less than 350 bps; if trading factor is 1, only improvements are allowed; if trading factor is 0, only de-improvements are allowed; and a time-dependent trading factor schedule must be observed. Of course, where specific numeric ranges or values are listed, there is nothing unique about the particular listed range or value and other ranges or values are contemplated. Additionally, some of the criteria may not be included.

Asset Management Agreement

There are a number of reasons for active management of a debt portfolio. Optimizing the return while minimizing the risk is one of the primary reasons, although there are other reasons. In the instant invention, the terms of the asset management agreement help to accomplish the objectives of continuing to obtaining good performance from the debt portfolio by using the management expertise of an asset manager. To reward good performance, the manager's fee usually has some dependence on a measurable performance metric of the names in the debt index.

Although active management of the debt index has advantages, large numbers of substitutions in the index may have negative impacts on relationships that are linked to the agreement. For this reason, the asset management agreement may limit the numbers of allowed substitutions and may also impose certain threshold criteria before a substitution is allowed. For example, the asset management agreement may require the manager to wait a predetermined time after initially identifying the initial portfolio of names before allowing any substitution or change in the portfolio of names.

These and other features are summarized below in the context of an example asset management agreement.

Advisor Fee

On each Fee Payment Date, the Advisor receives a fee equal to: [Base Fee+Performance Fee]×Portfolio Notional×Day Count Fraction where:

Base Fee: 8 bps

Performance Fee: 4 bps multiplied by Portfolio Factor (described below)

Portfolio Notional is an amount that represents the value of deals that are linked or can be linked to the asset management agreement.

Day Count Fraction: The applicable daycount fraction relating to the daycount convention 30/360.

Portfolio and Trading Factors

On each Factor Observation Date relating to a Fee Payment Date, the Sponsor calculates the Portfolio Factor and the Trading Factor.

Portfolio Factor: 1−0.35*Sum of Recovery Adjusted Credit Events. (For the avoidance of doubt the Portfolio Factor is subject to a minimum of zero.)

Trading Factor: 1−5*Sum of Spread Differences

Sum of Recovery Adjusted Credit Events: A percentage equal to the aggregate of all Recovery Adjusted Credit Events, determined without regard to any Credit Event in respect of which the Final Price has not been determined.

Recovery Adjusted Credit Event: With respect to the occurrence of any Credit Event, means a percentage equal to (100%−Final Price of the Reference Obligation relating to that Credit Event) multiplied by (100*Credit Position of the relevant Reference Entity). (For the avoidance of doubt, each of Final Price and Credit Event shall bear the definitions given to them in the 1999 ISDA Credit Derivatives Definitions, as may be amended.)

Sum of Spread Differences: On the Contract Date, the Sum of Spread Differences shall be deemed to be zero. With respect to any date occurring after the Contract Date, the Sum of Spread Differences shall be equal to the sum of the Spread Differences calculated for all Substitutions in respect of which a Substitution Date has occurred on or before that date.

Spread Difference: With respect to any Substitution, means:

[Old Offer multiplied by (100*Credit Position of this Name)]minus

[New Bid multiplied by (100*Credit Position of this Name)]

in each case relating to that Substitution. (For the avoidance of doubt, the Sum of Spread Differences decreases if the New Bid is larger than the Old Offer.)

Substitution Criteria

The Substitution Criteria shall be deemed to be satisfied if with respect to any proposed Substitution:

(1) either (a) following the proposed Substitution, the total number of Substitutions made to the Reference Portfolio expressed as a percentage of the number of Reference Entities in the Reference Portfolio as at the Contract Date would not be greater than the Maximum Substitution Percentage or (b) immediately prior to the proposed Substitution, the Number of Additional Substitutions is greater than zero;

(2) the total number of Substitutions made to the Reference Portfolio before the end of the first year would not be greater than four; and (3) notwithstanding the provision below, the New Reference Entity must have a long term rating of at least Baa3 by a first reputable rating company (XXX), and if it also has a long term rating from a second reputable rating company (YYY), this must be at least BBB-, or, if it is not rated by XXX, then it must have a long term rating of at least BBB by YYY; and (4) following the proposed substitution, (i) if the Weighted Average Long Term Rating Score before the substitution is below the Maximum Weighted Average Long Term Rating Score then the following condition shall apply: the Weighted Average Long Term Rating Score of the new Portfolio has to be lower than the Maximum Weighted Average Long Term Rating Score; (ii) otherwise, if the Weighted Average Long Term Rating Score before the substitution is above the Maximum Weighted Average Long Term Rating Score then the following condition shall apply: the Substitution Effective Rating of the New Reference Entity should be equal to, or better than the Substitution Effective Rating of the Old Reference Entity; and (5) the Country Classification of the New Reference Entity is as listed and the Sector Classification for the New Reference Entity is as listed; and (6) following the proposed substitution, (i) if the Weighted Average Recovery Rate before the substitution is above the Minimum Mean Recovery then the following condition shall apply: the Weighted Average Recovery Rate of the new Portfolio has to be higher than the Minimum Mean Recovery; (ii) otherwise, if the Weighted Average Recovery Rate before the substitution is below the Minimum Mean Recovery then the following condition shall apply: the recovery rate of the New Reference Entity should be equal to, or better than the recovery rate of the Old Reference Entity; and (7) following the proposed Substitution, the number of Reference Entities with the same Country Classification expressed as a percentage of the number of entities in the Reference Portfolio as at the Contract Date would not be greater than the Country Concentration Percentage related to that country as listed; and (8) following the proposed Substitution, the number of Reference Entities with the same Sector Classification expressed as a percentage of the number of Reference Entities in the Reference Portfolio as at the Contract Date would not be greater than the Sector Concentration Percentage related to this sector as listed; and (9) the Old Reference Entity has not been subject to a Credit Event nor does a Potential Failure to Pay exist with respect to the Old Reference Entity as at the Substitution Request Date; and (10) following the proposed Substitution, the new Reference Portfolio has a Diversity Score which is equal or higher than the Minimum Diversity Score; and (11) the recalculated Weighted Average Portfolio Spread after the relevant Substitution exceeds the Minimum Weighted Average Spread; and (12) at the relevant Substitution Request Date the New Bid is less than the Maximum Single Name Spread; and (13) following the proposed Substitution, the Trading Factor is greater than zero and smaller than one and fulfills the Schedule defined in Trading Factor Schedule; and (14) the Portfolio Factor is greater than zero.

Trading Factor Schedule

The Trading Factor shall be maintained smaller than 1 and larger than:

| Year 1 | 0.95 |
| Year 2 | 0.6 |
| Year 3 | 0.4 |
| Year 4 | 0.33 |
| Year 5 | 0.2 |
| Year 6 | 0.00 |

Figure 6:
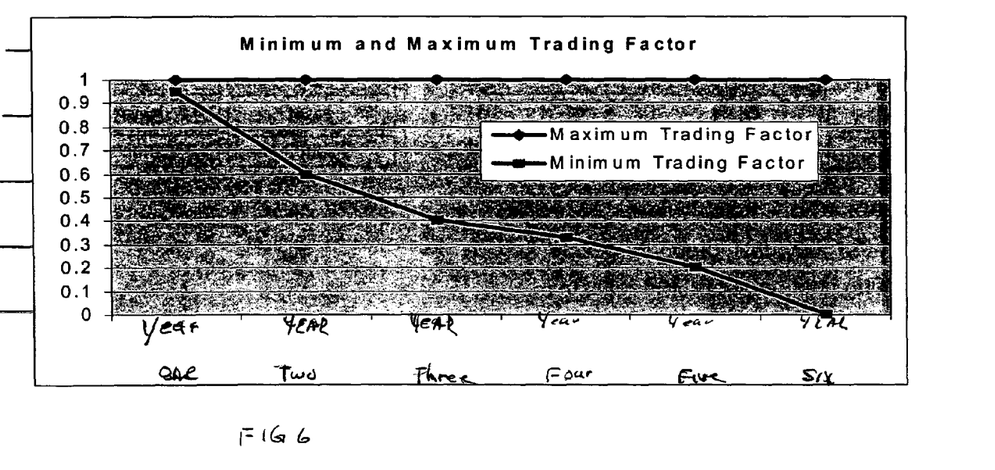
FIG. 6 illustrates an embodiment of a time variable trading factor.

FIG. 6 illustrates an example of such a time variable trading factor.

Additional Substitution Criteria

As discussed above, there is a Maximum Substitution Percentage, a Minimum Mean Recovery and a Maximum Single Name Spread. In one example embodiment, those values are 24%, 35%, and 350 basis points respectively.

The Maximum Weighted Average Long Term Rating Score in one embodiment is 378, and the Minimum Diversity Score is 52.

The Weighted Average Long Term Rating Score means the weighted average of the issuer senior unsecured rating scores as at the Substitution Request Date for each Reference Entity of the Reference Portfolio (following the proposed Substitution). The issuer senior unsecured rating scores for each Reference Entity will be determined using the long term rating company rating of each Reference Entity as at the Substitution Request Date or in the event that a issuer senior unsecured rating assigned to it by the rating company does not exist, a issuer senior unsecured rating by a rating company as at the Substitution Request Date.

Determination of New Bid and Old Offer (1) On the Substitution Request Date, the Advisor shall request the Authorized Dealers and Sponsor to provide firm bids (the "Bids") for credit protection on the New Reference Entity and firm offers (the "Offers") for credit protection on the Old Reference Entity, which in each case are firm for any amount between zero and the Quotation Size.

(2) For the purposes of the foregoing, "credit protection" shall be deemed to be a single name cash settled credit swap transaction relating to the relevant Reference Entity with the same terms as this Agreement modified as necessary by the Calculation Agent to reflect the fact that such transaction relates to a single name only, including without limitation the market standard definition of Loss Amount for a single name credit swap.

(3) The New Bid shall be deemed to be the greater of:
(a) the Bid provided by the Sponsor; and
(b) the highest Bid minus 3 basis points.

(4) The Old Offer shall be deemed to be the least of:
(a) the Offer provided by the Sponsor; and
(b) the lowest Offer plus 3 basis points.

(5) For the purposes of the foregoing:
(a) Quotation Size: EUR 30,000,000
(b) The Sponsor shall be under no obligation to provide a Bid or an Offer with respect to any entity, unless:
this entity has a issuer senior unsecured rating by a reputable rating company, and
this entity has outstanding bonds or loans with a maturity of at least 5 years.

(c) The sponsor shall be under no obligation whatsoever to enter into a transaction with the person providing the New Bid, or the Old Offer, as the case may be.

Termination of Asset Management Agreement or Termination of Link to Agreement

The asset management agreement may terminate for a number of different reasons. As examples, the agreement normally has a finite term and will terminate at the end of that finite term. The agreement also has certain performance requirements or objectives for the debt index. If the performance fails to meet those requirements or objectives, the agreement may terminate or some of the deals may no longer link to the agreement. The agreement may also have certain limits on the numbers of allowable substitutions at different times over the life of the agreement. If the asset manager violates those limits, the agreement itself may terminate or some of the deals may no longer link to the agreement.

Termination of the asset management agreement from different causes can have different effects for different entities or parties. In particular, if the termination is due to expiration of the finite agreement term, the term can be extended or another agreement can be entered and the existing deals can be modified to link to the extended or new agreement.

If the termination is due to failure to meet the performance requirements or objectives, the link of some deals 112 may be broken, while the link of other deals 112 may remain in effect. If is also possible that the entire agreement terminates and all links to the agreement are broken. These different circumstances might be provided within the asset management agreement 106, or they might be provided within each deal 112.

Different Deals or Special Purpose Vehicles

FIG. 2 illustrates some of the types of deals or special purpose vehicles that can be linked to the debt index according to the invention.

In other examples, the instant invention is offered in any form that the sponsor is capable of offering, (e.g., Listed Bond, EMTN, Schuldschein, Swap). This provides maximum flexibility with respect to format of the transaction.

The structure of the invention allows any Equity-type or Mezzanine-type transaction, (e.g. free choice for the client of lower and upper boundary); Capital-guaranteed transactions, (e.g. CLIP transactions); Part-Capital-Guaranteed transactions where only part of the capital is guaranteed; Minimum Coupon transactions; Payment of Portfolio improvement via spread or via subordination loss; Cost-dependent automatic termination of Portfolio Advisor; Cost-dependent optional callability of Portfolio Advisor; Time-dependent optional callability of Portfolio Advisor; Extended Maturity Transactions; Zero-Coupon Transactions; Equity-Kicker Transactions; and Transactions for the Funding Side.

The instant invention allows a transaction to be offered in almost any size desired by a client. This provides maximum flexibility with respect to size of the transaction.

The instant invention provides for any capital at risk structures where the coupon and final notional steps down linearly with losses of a first loss or mezzanine tranche.

Unlike a traditional CDO, there is no pre-defined tranching of the portfolio in the instant invention. Investors can select any combination of lower boundary and tranche size. In one embodiment, the total notional of all transactions must be within the limits defined in asset management agreement 106.

The invention also provides capital-guaranteed transaction with a long maturity, and the coupon stepping down linearly with losses on an equity tranche.

The invention also provides equity or Mezzanine Transaction which guarantee to pay back a certain percentage of the invested capital, the rest is put at risk.

The invention also provides capital at risk or capital-guaranteed transactions with a guaranteed minimum coupon.

The invention also provides payment of Portfolio improvement via spread or via subordination loss. In Mezzanine structures, normally the cost of improving the portfolio is "paid" via a loss in subordination for each mezzanine client. However, clients can also chose to pay the costs via a reduced coupon.

The invention also provides cost-dependent automatic termination of the asset management agreement. These are structures which automatically break the link to the asset management agreement and debt index when the costs of the portfolio changes (the subordination loss) have breached a certain threshold. In this case that client's portfolio becomes static, however the asset manager continues managing the debt index for the other clients.

The invention also provides cost-dependent optional callability of the asset management agreement: These are structures that give the client the right but not the obligation to break the link to the asset management agreement when the costs of the portfolio changes have breached a certain threshold. In this case that client's portfolio becomes static, however the asset manager continues managing the debt index for the other clients.

The invention also provides time-dependent optional callability of the asset management agreement: These are structures that give the client the right but not the obligation to break the link to the asset management agreement at a particular point in time. In this case that client's portfolio becomes static, however the asset manager continues managing the debt index for the other clients.

The invention also provides extended maturity transactions: These are structures that have a maturity far beyond the termination of the asset management agreement and thereby the Credit Risk period, for example an investor transaction may have a risk period of 5 years but a maturity of 14 years.

The invention also provides zero-coupon transactions. These are structures that don't pay a coupon until final maturity. As compared to coupon-bearing transactions, the IRR in case of no default is much larger.

The invention also provides equity-kicker transactions. These are equity or Mezzanine Structures that pay a slightly reduced coupon, but a potential bonus pool at maturity linked to an Equity tranche, in compensation for a slightly reduced coupon.

The invention also provides transactions for the funding side. Any of the above-described transactions or combinations thereof can be structured to fit the funding side of a financial institution.

Many more examples of different linked deals are possible, all of which use the same debt index 108 as the reference portfolio.

Different Types of Counterparties to Investor

In the instant invention, investors can face SPVs, Issuing Banks or the Sponsor. In comparison, known CDOs are traditionally set up via one particular SPV. Therefore, the instant invention provides maximum flexibility with respect to counterparty for the investor.

In particular, the investor can face his "own personal" SPV, which enables him to chose specifications such as the country in which the SPV is set up. Similarly, the investor can use Banks or Landesbanks. If the investor prefers, the Notes or Schuldschein can be issued by a highly rated Bank or Landesbank. The investor can also use notes issued by Fiduciary Deposits. Finally, the investor can use the Sponsor as the counterparty if the transaction is done in Swap format.

The invention further provides using other asset managers, transactions with other investors, other risk/return profiles, and a combination of two debt indexes managed by two different asset managers as a reference portfolio. For example, one asset manager manages a purely U.S. name based index and another asset manager manages a purely European index. The instant invention can accommodate a client's desire to have exposure to both indexed portfolios under the same transaction in a proportion they choose.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A computer-usable medium having a computer readable program code embodied therein, the computer readable program code adapted to be executed to implement a method for managing collateralized obligations, the method comprising:

identifying a plurality of debt obligations according to terms of an asset management agreement, which together constitute a single debt index;

receiving a first investment deal to link to the single debt index according to the terms of the asset management agreement, wherein one or more investors can invest in the first investment deal, and wherein the single debt index serves as the reference portfolio for the first investment deal;

receiving a second investment deal to link to the single debt index according to the terms of the asset management agreement, wherein one or more investors can invest in the second investment deal, and wherein the single debt index serves as the reference portfolio for the second investment deal;

receiving a request to substitute at least one debt obligation from the plurality of debt obligations in the single debt index;

determining if predefined criteria for selecting and substituting the at least one debt obligation from the plurality of debt obligations in the single debt index is satisfied according to the terms of the asset management agreement; and changing, responsive to the request to substitute the at least one debt obligation from the plurality of debt obligations in the single debt index, an obligation of the first investment deal linked to the single debt index according to the terms of the asset management agreement.

2. A computer for managing collateralized obligations, comprising:

a memory having at least one region for storing computer executable program code; and a processor for executing the program code stored in the memory, wherein the program code comprises instructions for:

identifying a plurality of debt obligations according to terms of an asset management agreement, which together constitute a single debt index;

receiving a first investment deal to link to the single debt index according to the terms of the asset management agreement, wherein one or more investors can invest in the first investment deal, and wherein the single debt index serves as the reference portfolio for the first investment deal;

receiving a second investment deal to link to the single debt index according to the terms of the asset management agreement, wherein one or more investors can invest in the second investment deal, and wherein the single debt index serves as the reference portfolio for the second investment deal;

receiving a request to substitute at least one debt obligation from the plurality of debt obligations in the single debt index;

determining if predefined criteria for selecting and substituting the at least one debt obligation from the plurality of debt obligations in the single debt index is satisfied according to the terms of the asset management agreement; and changing, responsive to the request to substitute the at least one debt obligation from the plurality of debt obligations in the single debt index, an obligation of the first investment deal linked to the single debt index according to the terms of the asset management agreement.

3. The computer according to claim 2, wherein the program code further comprises instructions for changing, responsive to the change of the debt obligation in the single debt index, an obligation of the linked second investment deal.

4. The computer according to claim 2, wherein the program code further comprises instructions for establishing a tranche structure for the linked first investment deal.

5. The computer according to claim 4, wherein the tranche structure has a single tranche.

6. The computer according to claim 4, wherein the program code further comprises instructions for establishing a tranche structure for the linked second investment deal, wherein the tranche structure of the first linked investment deal is different from the tranche structure of the second linked investment deal.

7. The computer according to claim 2, wherein the first and second investment deals are formed at distinct and different times.

8. The computer according to claim 2, wherein the program code further comprises instructions for waiting a predetermined time, after identifying the plurality of debt obligations, before allowing any change of the at least one debt obligation in the single debt index.

9. The computer according to claim 2, wherein the program code further comprises instructions for establishing, for different times, a predetermined amount of allowable changes to the single debt index based on the terms of the asset management agreement.

10. The computer according to claim 2, wherein the program code further comprises instructions for establishing a maximum value of investment deals that can be linked to the single debt index.

11. The computer according to claim 10, wherein the maximum value is a percentage of the total obligations that constitute the single debt index.

12. The computer according to claim 2, wherein the program code further comprises instructions for breaking, responsive to a change of a debt obligation in the single debt index, the link to the first investment deal.

13. The computer according to claim 2, wherein the asset management agreement is an agreement between a sponsor and an asset manager, and wherein the program code further comprises instructions for managing the single debt index according to terms of the asset management agreement.

14. The computer according to claim 2, wherein the linked first investment deal is a special purpose vehicle.

15. The computer according to claim 2, wherein the linked first investment deal is a managed note.

16. The computer according to claim 2, wherein the linked first investment deal is a managed schuldschein.

17. The computer according to claim 2, wherein the linked first investment deal is a swap.

18. The computer according to claim 2, wherein the obligation of the linked first investment deal is a debt obligation.

19. The computer according to claim 2, wherein the obligation of the linked first investment deal is a synthetic obligation.

* * * * *